United States Patent [19]

Uchino

[11] Patent Number: 4,521,967
[45] Date of Patent: Jun. 11, 1985

[54] HEIGHT GAUGE
[75] Inventor: Kenju Uchino, Utsunomiya, Japan
[73] Assignee: Mitutoyo Mfg. Co., Ltd., Tokyo, Japan
[21] Appl. No.: 487,939
[22] Filed: Apr. 25, 1983
[30] Foreign Application Priority Data May 8, 1982 [JP] Japan .................................. 57-77248

[51] Int. Cl.³ ............................ G01B 3/20; G01B 5/02
[52] U.S. Cl. ................................................. 33/169 R
[58] Field of Search ..................... 33/1 D, 169 R, 170

[56] References Cited

U.S. PATENT DOCUMENTS

| 819,243 | 5/1906 | Mothes | 33/170 |
| 2,544,004 | 3/1951 | Bauer | 33/170 |
| 2,932,899 | 4/1960 | Arzoian | 33/169 R |
| 3,251,133 | 5/1966 | Turtschan | 33/169 R |

FOREIGN PATENT DOCUMENTS

| 705653 | 6/1931 | France | 33/169 R |
| 900520 | 7/1945 | France | 33/169 R |
| 26318 | of 1904 | United Kingdom | 33/170 |

Primary Examiner—Richard R. Stearns
Attorney, Agent, or Firm—Flynn, Thiel, Boutell & Tanis

[57] ABSTRACT

This height gauge includes a support erected on a base, a slider movable on the support, a main graduated scale with no numerical values vertically movable in the moving direction of the slider, and a numerical value belt movable on one side of this main graduated scale with no numerical values. The movement of this numerical value belt makes it possible to zero-set the slider at a desired position on the support.

8 Claims, 8 Drawing Figures

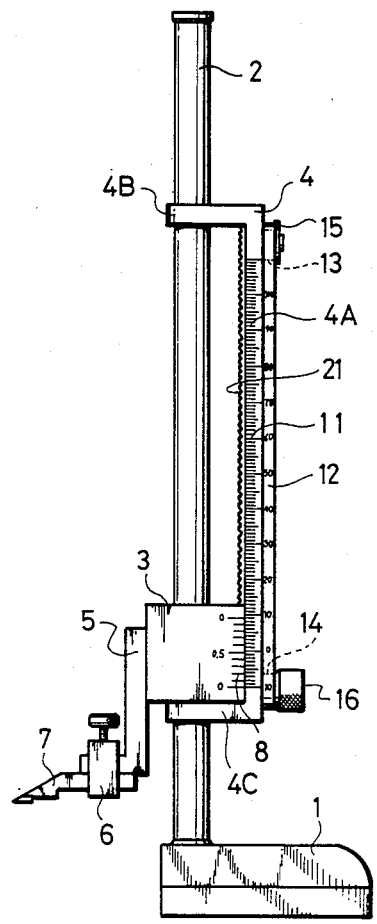
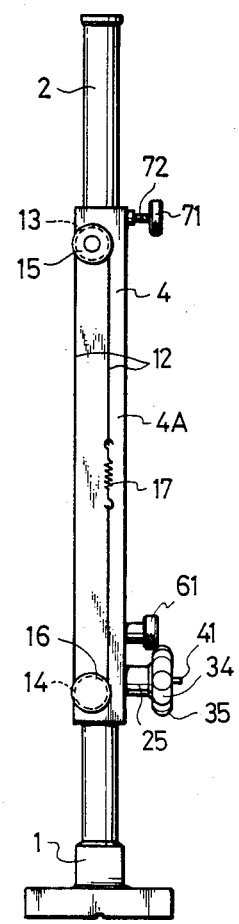

FIG. 3
FIG. 8
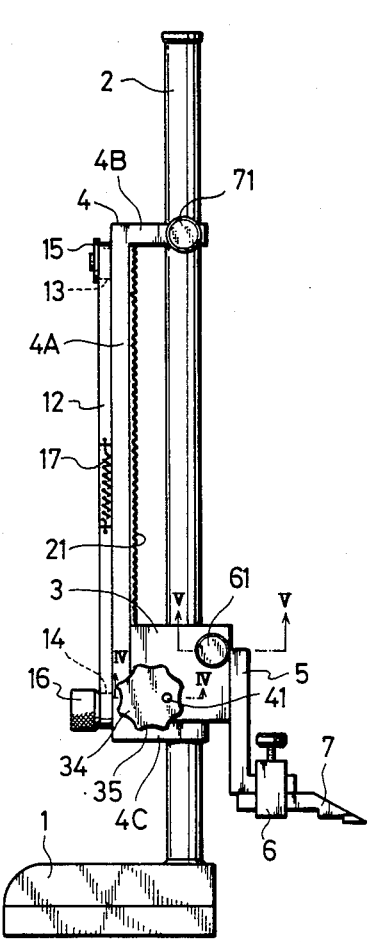
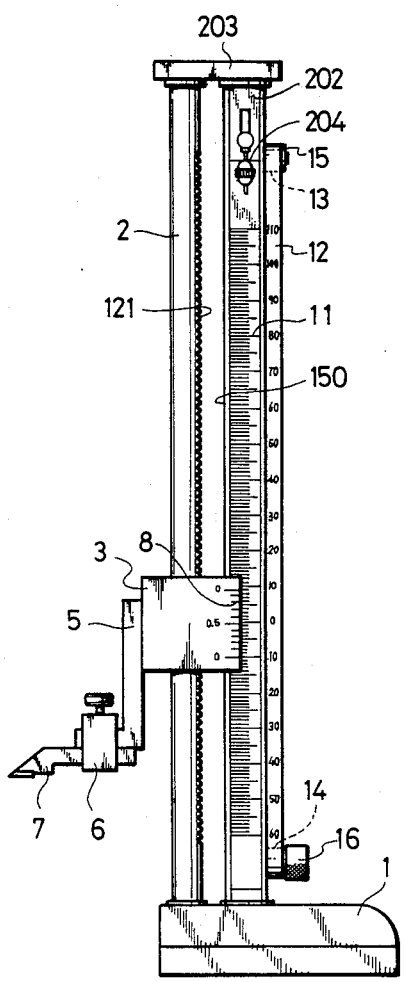

4,521,967

HEIGHT GAUGE

BACKGROUND OF THE INVENTION

1. Field of the Invention

This invention relates to height gauges, and more particularly to a height gauge having a simplified construction and capable of allowing a slider to be zero set on a support in a desired position.

2. Description of the Prior Art

There has heretofore been widely used a so-called direct reading type height gauge wherein a main graduated scale is put on a support erected on a base, and a movement value of a slider movably supported by this support is read from the main graduated scale. While the direct reading type height gauge of the type described is simplified and tough in construction and low in cost, disadvantages have been presented that when conversion of dimensions from one system to another is needed, and particularly, in the case of measuring a deviation value where the slider is vertically moved as referenced from a given value, there is a possibility of causing confusion in the conversion, thus resulting in inconvenience in handling.

On the other hand, to obviate the inconvenience in handling as described above, a height gauge has been used in which an accurately finished rack is provided on the support in place of the main graduated scale, and there is provided an electronic counter or a mechanical counter incorporating therein a rotary encoder driven by the aforesaid rack. The height gauge as described above is very convenient because it has a so-called zero-setting function capable of zero-setting a counter (an indicating portion) no matter what position on the support the slider takes. This height gauge presents such disadvantages that the construction is very complicated, the number of parts is increased, the cost is very high, problems are easily caused, and control and maintenance are difficult.

SUMMARY OF THE INVENTION

The present invention has as its object the provision of a height gauge which is simplified in construction, and moreover, has a zero-setting mechanism.

To the above end, according to the present invention, a main graduated scale with no numerical values is movably provided in the moving direction of a slider, a numerical value belt movable in the graduated direction of the main scale having no numerical values is provided adjacent the main graduated scale with no numerical values, the main graduated scale with no numerical values is moved to meet the slider located at a desired reference position in zero-setting, and subsequently, the numerical value belt is moved, so that the main graduated scale with no numerical values can indicate zero at the position of the slider.

In addition, the main scale of graduations with no numerical values refers to a main graduated scale wherein only the graduation lines are provided with no numerical values being added. The main graduated scales with no numerical values include one having numerical values indicating only the lower place on the graduation lines between the graduation lines indicating the upper place, with no upper place being indicated.

BRIEF DESCRIPTION OF THE DRAWINGS

FIG. 1 is a front view showing the general arrangement of a first embodiment of the height gauge according to the present invention;

FIG. 2 is a right side view of FIG. 1;

FIG. 3 is a rear view of FIG. 1;

FIG. 8 is a front view showing the general arrangement of a third embodiment.

DETAILED DESCRIPTION OF THE INVENTION

Figure 4:
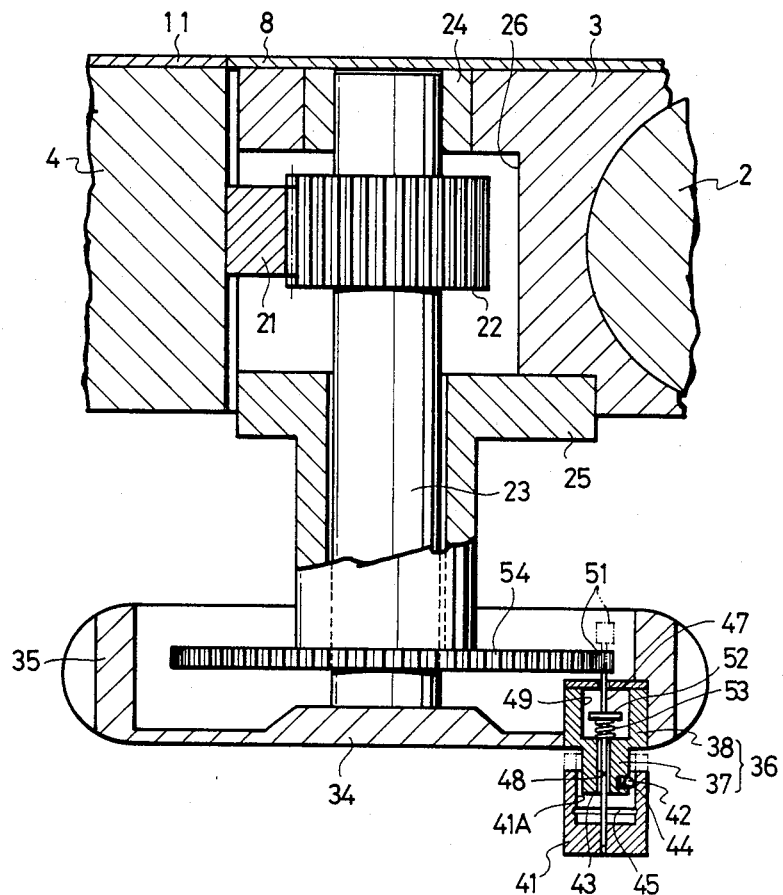
FIG. 4 is an enlarged sectional view in the direction indicated by the arrows from line IV—IV in FIG. 3.

Description will hereunder be given of the preferred embodiments of the present invention with reference to the drawings.

FIGS. 1 through 3 show the general arrangement of the first embodiment. In these drawings, a support 2 of a round rod-like shape is erected on a base 1, and a slider 3 and a main scale slider 4 are supported on the support 2 in a manner to be movable in the longitudinal direction of the support 2.

The slider 3 is formed into a substantially square block shape, having the support 2 slidably inserted therethrough, and a scriber 7 is secured to the left side surface thereof in FIG. 1 through a jaw 5 and a scriber clamp 6. Additionally, a vernier graduated scale 8 is notched on the right end edge of the side surface of the slider 3 on the front as shown in the drawing.

The main scale slider 4 is generally formed into a substantially elongated U-shape, and has a vertical portion 4A which is elongated, square in section and disposed in parallel to the support 2, an upper horizontal portion 4B and a lower horizontal portion 4C, both of which are projected from opposite ends of the vertical portion 4A in directions parallel to each other in the horizontal direction.

Such an arrangement is adopted that the right side edge of the slider 3 is in sliding contact with the left side edge in FIG. 1 of the vertical portion 4A, whereby, when the slider 3 is moved, the slider 3 is guided by the main scale slider 4, while, when the main scale slider 4 is moved, the main scale slider 4 is guided by the slider 3. A main graduated scale with no numerical values 11 is provided on the side surface in front in FIG. 1 of the vertical portion 4A substantially over the total length of the vertical portion 4A. This main graduated scale with no numerical values 11 and the vernier graduated scale 8 of the slider 3 are brought flush with each other so as to form one plane.

Furthermore, a numerical value belt 12 is provided on the right side surface in FIG. 1 of the vertical portion 4A, i.e., on the side surface in front in FIG. 2 of the vertical portion 4A, at a portion adjacent to the main scale with no numerical values 11. The numerical value belt 12 is formed of an elongated, flexible strip-like member having a predetermined width such as a metallic belt, a rubber belt, a synthetic resin belt or the like, and is stretched across an upper pulley 13 and a lower pulley 14. The upper pulley 13 is rotatably secured to the top end portion of the vertical portion 4A, and provided thereon with a flange plate 15 to prevent the numerical value belt 12 guided therearound from falling off. The lower pulley 14 is rotatably mounted to the bottom end portion of the vertical portion 4A and has a rotary knob 16 which additionally functions to prevent the numerical value belt 12 from falling off.

As shown in FIG. 2, opposite ends of the numerical value belt 12 are connected to each other through a coil spring 17, which renders a tensile force of a predetermined value to the numerical value belt 12 stretched across the pulleys 13 and 14. When the rotary knob 16 is rotated, the numerical value belt 12 moves in the vertical direction in the drawing, i.e., in the graduated direction of the main scale with no numerical values 11 commensurate to a rotation value of the rotary knob 16. In addition, when the numerical value belt 12 is formed of a rubber belt or the like which has its own elasticity or resiliency, the aforesaid coil spring 17 is not particularly needed.

A plurality of numerical values are given on the circumferential surface of the numerical value belt 12 at intervals equal to the intervals of the graduation lines showing the upper place of the main scale with no numerical values 11. These numerical values are arranged such that zero is given at a predetermined position on the numerical value belt 12, and numerical values are successively increased at a rate of 10, 20, 30, etc., for example, in accordance with the values in the upper place of the main scale with no numerical values 11 in vertically opposite directions as referenced from zero. Therefore, if the rotary knob 16 is rotated to align zero of the values given on the numerical value belt 12 with any one of the lines indicating the upper place of the main scale graduation with no numerical values 11, then the upper place of the graduated scale 11 is indicated by the numerical value belt 12 as a value referenced from zero in vertically opposite directions as referenced from zero.

A rack 21 is provided on the right side surface in FIG. 3 of the vertical portion 4A of the main scale slider 4 in the moving direction of the slider 3, i.e., in the longitudinal direction of the vertical portion 4A substantially over the total length of the vertical portion 4A. This rack 21 is in meshing engagement with a pinion 22 provided on the slider 3. The rack 21 and the pinion 22 constitute a moving means for the slider 3 and the main scale slider 4.

As shown in FIG. 4, the pinion 22 is coupled and affixed to a pinion shaft 23, or integrally formed on the pinion shaft 23. The pinion shaft 23 is rotatably supported by the slider 3 through bearings 24 and 25 which are solidly secured to the slider 3 in a hollow portion 26 formed in the slider 3. Furthermore, one end portion of the pinion shaft 23 is projected from the bearing 25, and a hand grip 34 is affixed to the end portion thus projected.

The hand grip 34 is formed into a substantially round tray shape opening towards the slider 3, and formed at the outer peripheral portion thereof with a grip portion 35 formed into a substantially polygonal shape so that the hand grip 34 can be directly gripped to facilitate operation.

A guide member 36 is embedded at a predetermined position close to the outer periphery of the hand grip 34. This guide member 36 is formed into a two-stepped column having a small diameter portion 37 and a large diameter portion 38, which are different in outer diameter from each other. The small diameter portion 37 is projected downwardly in FIG. 4 from the side surface of the hand grip 34 and the large diameter portion 38 is positioned on the side of the slider 3. A fine feed grip 41 of a tubular cup shape is coupled onto the small diameter portion 37 projected from the hand grip 34 of this guide member 36, in a manner to be linearly movable toward the slider 3.

A small engaging piece 42 is frictionally abutted against a predetermined portion of the inner peripheral surface 41A of the fine feed grip 41. This engaging piece 42 is housed in a small hole 43 penetrated in the small diameter portion 37 in the radial direction thereof, and biased outwardly in the radial direction of the small diameter portion 37 by a compression spring 44. Here, the inner peripheral surface 41A, the engaging piece 42 and the compression spring 44 constitute an engaging mechanism. The fine feed grip 41 is held at a position directed downwardly by this engaging mechanism as indicated by solid lines in FIG. 4.

Furthermore, a circumferential groove 45 is formed in a predetermined position close to the bottom portion of the inner peripheral surface 41A in the circumferential direction. This circumferential groove 45, the engaging portion 42 and the compression spring 44 constitute a releasing mechanism. A head of the engaging piece 42 is slightly coupled into the circumferential groove 45 of this releasing mechanism in a state where the fine feed grip 41 has moved a predetermined value toward the slider 3, so that the fine feed grip 41 can be held at a position indicated by two-dot chain lines in the drawing.

Extended from the bottom of the fine feed grip 41 toward the slider 3 is a fine feed pinion shaft 47 having a predetermined length. This fine feed pinion shaft 47 is inserted through a support hole 48 formed in the center axis portion of the guide member 36 and a hollow portion 49 provided closer to the slider 3 than the support hole 48, extends further, and is solidly secured at the forward end thereof with a fine feed pinion 51.

A receiving portion 52 such as a C-shaped washer or the like is affixed onto a predetermined portion of the fine feed pinion shaft 47 in the hollow portion 49. A compression coil spring 53 is confined between the end face of the guide member 36 in the hollow portion 49 and the receiving portion 52. The fine feed grip 41 and the fine feed pinion 51 are biased by this compression coil spring toward the slider 3 as indicated by two-dot chain lines in the drawing.

Furthermore, the fine feed pinion 51 is engageable with a large gear 54 which is affixed to the side of the slider 3 through the bearing 25. Additionally, this large gear 54 is a spur gear having a far larger diameter than the fine feed pinion 51. In a state where the fine feed grip 41 has been pulled in a direction away from the slider 3, whereby the fine feed pinion 51 is engaged with the large gear 54, and held still (refer to a portion indicated by solid lines in FIG. 4), the fine feed grip 41 is frictionally engaged by a frictional force of the engaging piece 42 being frictionally abutted against the inner peripheral surface 41A of the engaging mechanism, so that the fine feed pinion 51 can be held in engagement with the large gear 54. However, if the static frictional condition between the engaging piece 42 and the inner peripheral surface 41A is broken down due to rotation of the hand grip 34 and the like, then the fine feed grip 41 is moved toward the slider 3 by the biasing force of the compression coil spring 53, whereby the fine feed pinion 51 is disengaged from the large gear 54. In other words, the engaging mechanism performs the function of holding the engagement between the fine feed pinion 51 and the large gear 54 against the biasing force of the compression coil spring 53.

Furthermore, the releasing mechanism performs the function of holding the released state, in which the fine feed pinion 51 is released from the large gear 54, so that the fine feed pinion 51 can avoid carelessly engaging or impinging on the large gear 54.

Figure 5:
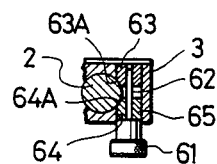
FIG. 5 is a sectional view in the direction indicated by the arrows from line V—V in FIG. 3.

The slider 3 is provided thereon with a clamp grip 61. The clamp grip 61 is disposed on the same side surface of the slider 3 as where the hand grip 34 is provided, and, as shown in FIG. 5, a clamp screw 62 is solidly secured to the clamp grip 61. Two clamping members 63 and 64 each have a substantially columnar shape are coupled onto the clamp screw 62, and the clamping member 63 is threadably coupled onto the forward end portion of the clamp screw 62. These clamping members 63 and 64 are coupled into a coupled-in portion 65 having a columnar shape formed in the slider 3. As the clamp grip 61 is rotated, the clamping members 63 and 64 are adapted to approach or recede from each other accordingly. Furthermore, tapered portions 63A and 64A are formed on the clamping members 63 and 64, respectively, both of which are abutted at these tapered portions 63A and 64A thereof against the peripheral surface of the support 2. As the clamping members 63 and 64 approach each other, the slider 3 is clamped against the support 2.

Designated at reference numeral 71 in FIGS. 2 and 3 is a clamp grip for the main scale slider 4. Rotation of the clamp grip 71 for the main scale slider 4 causes the forward end of the clamp screw 72 to be directly abutted or indirectly abutted through an abutting member, not shown, against the support 2, so that the main scale shider 4 can be clamped against the support 2.

Description will hereunder be given of action of the embodiments.

In moving the slider 3, the hand grip 34 is rotated with the main scale slider 4 being clamped against the support 2 by means of the clamp grip 71. Rotation of the hand grip 34 causes the pinion 22 to rotatably move on the rack 21, whereby the slider 3 vertically moves on the support 2 accordingly. In this case, as the hand grip 34 is directly grasped and rotated, the slider 3 moves at high speed, and reaches a desired position. Then, if fine feed is desirable, the fine feed grip 41 of the hand grip 34 is pulled. Thereupon, in a state where the fine feed grip 41 has been pulled, the fine feed grip 41 is gripped and rotated, whereby the fine feed pinion 51 is engaged with the large gear 54 to rotate the pinion shaft 23, i.e., the pinion 22 at low speed, so that the slider 3 can be finely fed.

To move the slider 3 to a desired position as described above and make this position a reference point, firstly, the slider 3 is clamped against the support 2 by means of the clamp grip 61 for the slider 3, and subsequently, the clamp grip 71 for the main scale slider 4 is untightened. Thereafter, when the hand grip 34 is operated, the main scale slider 4 becomes movable. Then, the main scale slider 4 is moved, so that any one of suitable graduation lines out of a plurality of graduation lines indicating the upper place of the main scale with no numerical values 11 may be brought into alignment with the center line of the vernier graduation 8. The fine feed can be performed while the main scale slider 4 moves in the same manner as in the case of moving the slider 3.

Thereafter, the rotary knob 16 is rotated to move the numerical value belt 12, so that zero of the numerical value belt 12 can be positioned at a height equal to the graduation line of the main scale with no numerical values 11 in alignment with the center line of the vernier graduation 8. If the numerical value belt 12 is moved as described above, then there will be indicated dimensions at vertically opposite sides as referenced from the position where the slider 3 is presently clamped by the main scale with no numerical values 11 and the numerical value belt 12 disposed adjacent to this main scale with no numerical values 11, i.e., zero-setting is completed.

Upon completion of zero-setting as described above, the main scale slider 4 is again clamped against the support 2 by means of the grip 71, the clamp grip 61 for the slider 3 is untightened and the hand grip 34 is operated, whereby the slider 3 is moved on the support 2. If the slider 3 is moved to a predetermined position and reference is made to a numerical value of the numerical value belt 12 by use of the vernier graduation 8, then a dimension from the zero-set position can be easily read.

The following advantages can be offered by this embodiment as described above.

This embodiment is advantageous in that this embodiment has a zero-setting mechanism while having a very simple and tough construction as a whole. A desired position can be set as a zero position and dimensions at vertically opposite sides as referenced from this zero position can be measured. The zero-setting function in this embodiment can be achieved by use of the main scale with no numerical values 11 and the numerical value belt 12, so that there is no possibility of becoming unusable due to a failure in the power source as in the case of a digital type height gauge incorporating therein a rotary encoder. Necessity for the provision of separate counters for use in the upward and downward directions as in the case of the mechanical counter type height gauge can be eliminated, and necessity for the provision of a complicated gearing for driving the counter can be eliminated. In the case of the digital type and the mechanical counter type height gauges, a balance weight has been often provided for the purpose of facilitating the operation of the slider and preventing the slider from falling off. However, in this embodiment, necessity for the provision of the balance weight is eliminated, thus resulting in simplified construction as compared with the conventional height gauges performing the zero-setting function.

The rack 21 and the pinion 22 are intended only for transferring the slider 3 and the main scale slider 4, not for determining a movement value of the slider 3 from the number of rotations of the pinion 22, whereby both the rack 21 and the pinion 22 do not adversely affect the measuring accuracy, so that finishing with high accuracy is not required therefor. Finishing with high accuracy is required for the main scale with no numerical values 11 and the vernier graduation 8. However, it is very easy to finish these graduations 11 and 8 with high accuracy. Additionally, since the numerical value belt 12 may serve as the basis of an estimate for the main scale 11, strictness is not required for the intervals between the numerical values described on the numerical value belt 12.

As compared with the conventional height gauge performing the zero-setting function, this embodiment is advantageous in that the construction is highly simplified, and accordingly, tough and almost trouble-free, the control and operation thereof are easily carried out, and strictness in finishing accuracy for the parts is not required as described above, so that the product can be provided at very low cost.

Further, since the slider 3 and the main scale slider 4 can be moved by use of only one hand grip 34, the controllabilty is high. Moreover, the hand grip 34 can perform the fine feed, so that the slider 3 and the main scale slider 4 can be positioned easily and accurately.

Furthermore, the graduation lines of the main scale with no numerical values 11 are allowed to indicate various dimensions by the movement of the numerical value belt 12, so that the presetting can be facilitated.

Description will hereunder be given of embodiments other than the preceding one. Like reference numerals as shown in the preceding embodiment are used throughout the figures to designate the same or similar parts, so that description thereof will be omitted or simplified.

Figure 6:
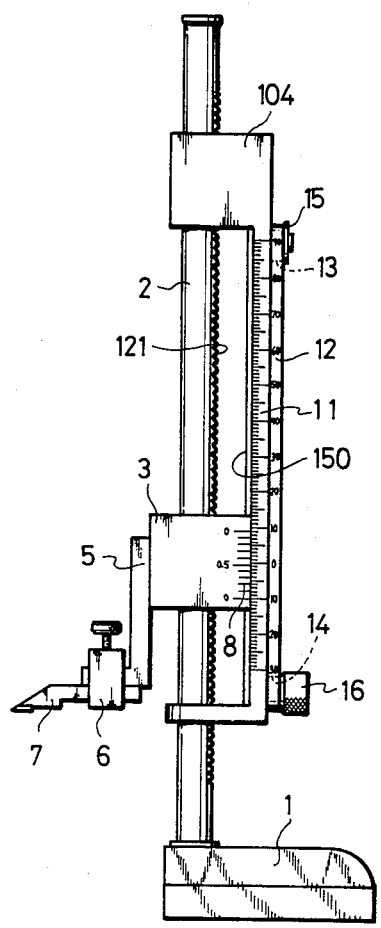
FIGS. 6 and 7 are a front view and a rear view showing the general arrangement of a second embodiment, respectively.
Figure 7:
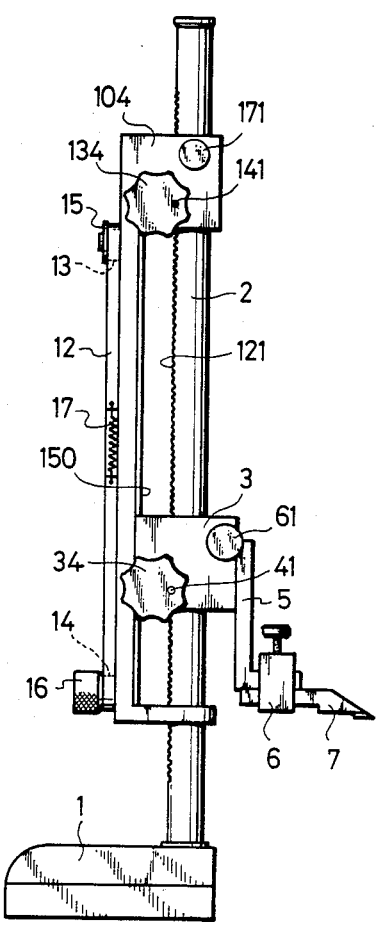

FIGS. 6 and 7 show the general arrangement of the second embodiment. In the second embodiment, a rack 121 is provided on the support 2, and this rack 121 is brought into meshing engagement with a pinion, not shown, provided on the slider 3 and a pinion, not shown, provided on the main scale slider 104. The slider 3 is moved by the hand grip 34 in the same manner as in the first embodiment. A main scale slider 104 is moved by a hand grip 134 provided on the main scale slider 104. This hand grip 134 has a construction similar to that of the hand grip 34 for the slider 3, whereby a fine feed grip 141 is operated to perform a fine feed. Additionally, in FIGS. 6 and 7, designated at reference numeral 150 is a rail provided on the main scale slider 104. This rail 150 guides the slider 3 in the longitudinal direction of the main scale slider 104.

In this second embodiment, the slider 3 and the main scale slider 104 are moved by the pinions separate from each other. However, this arrangement can display the function and advantages similar to those of the first embodiment.

FIG. 8 shows the general arrangement of the third embodiment. In the third embodiment, unlike the first and second embodiments, the main scale slider 4 or 104 is not provided, and the main scale with no numerical values 11 is supported on a main scale support 202. The main scale support 202 is formed into a square pillar shape, erected on the base 1 similarly to the support 2, and connected and affixed at the top end thereof to the top end of the support 2 through a connecting member 203, and the main scale support 202 and the support 2 are in parallel to each other.

The main scale with no numerical values 11 is made movable in the vertical direction in the drawing, i.e., in the moving direction of the slider 3 by at least one distance across the graduation lines of the upper place of the graduation of the scale 11 by means of a moving mechanism 204, and can be fixed. Additionally, the numerical value belt 12 is provided on the main scale support 202. This third embodiment can also display the same function and advantages as in the first and second embodiments.

In the foregoing description, the hand grip 34 or 134 has the fine feed mechanism, however, the fine feed need not necessarily be provided. The movement of the slider 3 need not necessarily be performed by the hand grip 34, but, may be performed by directly grasping the slider 3.

In the numerical value belt 12, there are given the numerical values increasing in vertically opposite directions as referenced from zero, however, numerical values increased only in the upward direction may be used, for example. However, in the case of the above-described embodiments, the measurement of a deviation may be carried out very easily and quickly.

Additionally, the vernier graduation 8 of the slider 3 need not necessarily be provided, however, the provision of the vernier graduation 8 makes it possible to conduct accurate reading.

Further, the main scale with no numerical values 11 or the vernier graduation 8 is provided at only one side of the support 2, but may be provided on both sides, having identical shapes on the front and rear surfaces of the support 2 and allowing the height gauge to be used from both surfaces of the support 2.

Furthermore, in the main scale with no numerical values 11, there may be used numerical values indicating only the lower place. Further, in the main scale with no numerical values 11, there may be additionally given graduation lines according to the metric system and the inch system, and further, in the numerical value belt 12, numerical values for indicating according to the metric system and numerical values according to the inch system can be given in colors different from each other, for example, so that measurment both in the metric system and the inch system may be carried out. Furthermore, in the numerical value belt 12, over substantially one half of the total length, numerical values for indicating in the metric system may be given, while, over substantially the remaining half of the total length, numerical values for indicating in the inch system may be given, whereby the height gauge may be used from both sides of the support 2, so that the measurement according to the metric system can be conducted when the height gauge is used from one side, and the measurement according to the inch system can be performed when the height gauge is used from the other side.

As has been described hereinabove, the present invention can provide a height gauge simplified in construction and to which performs the zero-setting function.

What is claimed is:

1. A height gauge, comprising:
a base;
an elongated support erected on said base;
a main slider slidably mounted on said support in the lengthwise direction thereof;
means for releasably securing said main slider to said support;
a main graduated scale formed on said main slider in the direction of movement of said main slider along said support, said scale being free of numerical indications designating distances between graduations of said main scale;
a measuring slider slidably supported on said support in the lengthwise direction thereof, said measuring slider being adjacent to one side of said main slider and having vernier graduations thereon readable in conjunction with said main scale;
a pair of upper and lower pulleys mounted near opposite ends of said main slider on the opposite side thereof from said measuring slider;
a flexible endless belt resiliently tensioned around said pulleys for movement therewith, said belt having numerical value indications formed thereon at regular intervals which correspond to graduations of said main scale, said belt being positioned parallel and adjacent to said main scale, on the opposite side thereof from said measuring slider to allow numerical readings of said main scale to be made using said belt; and means for adjustably securing said measuring slider to said main slider, including a toothed rack formed on said main graduated scale parallel to the direction of movement of said main scale along said support, a pinion mounted on said measuring slider and engaged with said rack, and a hand grip for driving said pinion to move said measuring slider relative to said main graduated scale.

2. A height gauge as claimed in claim 1, further comprising a scriber adjustably secured to said measuring slider.

3. A height gauge as claimed in claim 1, wherein said endless belt comprises a metallic belt and a spring for stretching said belt connected to opposite end portions of said metallic belt.

4. A height gauge as claimed in claim 1, wherein said endless belt is formed of rubber.

5. A height gauge as claimed in claim 1, wherein said pinion has a shaft, and a fine feed pinion is rotatably supported on said hand grip secured at one end to said pinion shaft, and a large gear meshable with said fine feed pinion is fixedly secured to said measuring slider in such a manner that said large gear is concentric with and inserted therethrough with said pinion shaft.

6. A height gauge as claimed in claim 5, wherein a biasing means is provided so that said fine feed pinion is normally disengaged from said large gear by said biasing means.

7. A height gauge, comprising:
a base;
a first elongated support erected on said base;
a second elongated support erected on said base parallel to said first support;
means rigidly connecting the ends of said first and second supports remote from said base;
a graduated scale formed on said second support in the lengthwise direction thereof, said scale being free of numerical indications designating distances between graduations of said scale, and said scale being movable in the lengthwise direction of said second support over a predetermined distance range;
a measuring slider slidably supported on said first support in the lengthwise direction thereof;
a flexible endless belt mounted on said second support for movement in the lengthwise direction of said graduated scale, said belt having numerical value indications formed thereon at regular intervals which correspond to graduations of said main scale, said belt being positioned to allow numerical readings of said main scale to be made using said belt; and means for adjustably securing said measuring slider to said first support.

8. A height gauge as claimed in claim 7, wherein said second support has a guide rail formed thereon, said slider is guided by said guide rail, and said adjustable securing means comprises a toothed rack formed on said first support in the lengthwise direction thereof, a pinion rotatably secured to said measuring slider, said pinion being in meshed engagement with said rack, and a hand grip formed at one end of said pinion.

* * * * *